United States Patent [19]
Seong et al.

[11] Patent Number: 5,777,864
[45] Date of Patent: Jul. 7, 1998

[54] RESONANT CONVERTER CONTROL SYSTEM HAVING RESONANT CURRENT PHASE DETECTION

[75] Inventors: Hwan-Ho Seong; Jin-Ho Shin, both of Seoul, Rep. of Korea

[73] Assignee: Samsung Electronics Co., Ltd., Suwon, Rep. of Korea

[21] Appl. No.: 745,706

[22] Filed: Nov. 12, 1996

[30] Foreign Application Priority Data

Dec. 28, 1995 [KR] Rep. of Korea .................. 95-61865

[51] Int. Cl.[6] ............................................. H02M 3/24
[52] U.S. Cl. ...................... 363/98; 363/17; 363/132; 323/217; 323/238
[58] Field of Search .......................... 363/97, 132, 17, 363/98, 59; 323/217, 238

[56] References Cited

U.S. PATENT DOCUMENTS 4,820,891  4/1989  Tanaka et al. .................. 219/10.77

Primary Examiner—Robert Nappi
Assistant Examiner—Shawn Riley
Attorney, Agent, or Firm—Marger, Johnson, McCollom & Stolowitz, PC

[57] ABSTRACT

A resonant convertor control system regulates a resonant AC current based on the amount of input power consumed by the system. The switching frequency and resonant AC current are limited by a phase difference assurance circuit that compares the phase of a drive signal with the phase of the resonant AC current. By detecting the phase of the resonant current instead of the resonant voltage, it eliminates the need for the costly components required to detect the resonant voltage. The system includes a main power supply for supplying a DC power signal and an inverter that converts the DC power signal to a resonating AC current signal responsive to a drive signal from a drive stage. An input current controller receives a first sense signal that indicates the power consumed by the main power supply and generates a first control signal that regulates the power consumed by the load. A phase difference assurance circuit generates a second control signal responsive to phase difference between the resonant AC current signal and the drive signal. The second control signal adjusts the frequency signal responsive to the second control signal, thereby assuring a phase difference between the second sense signal and the drive signal and eliminating excessive current flow in the inverter.

23 Claims, 3 Drawing Sheets

RESONANT CONVERTER CONTROL SYSTEM HAVING RESONANT CURRENT PHASE DETECTION

This application corresponds to Korean Patent Application No. 95-61865 filed Dec. 28, 1995 in the name of Samsung Electronics Co., Ltd., which is herein incorporated by reference.

BACKGROUND OF THE INVENTION

1. Field of the Invention

This invention relates generally to resonant convertors and more particularly to a method and apparatus for controlling a resonant convertor.

2. Description of the Related Art

FIG. 1 is a detailed schematic diagram of a conventional resonant convertor control system. As shown in FIG. 1, a conventional resonant convertor control system includes a main power supply 10 for converting power from an alternating current AC source 1 to a direct current DC power signal. The main power supply includes a rectifier bridge 11, a filter capacitor 12, and an inverter section 20 which converts the DC power signal to a high frequency resonating AC signal. The inverter section 20 includes two insulated gate bipolar transistors (IGBT) 21 and 22, two fast recovery diodes 23 and 24, which are connected in parallel with IGBT's 21 and 22, respectively, two resonant capacitors 26 and 27, and a resonant inductor 25. The IGBT's 21 and 22 are switched at a high frequency to control the resonant voltage and resonant current.

A gate drive circuit 30 generates gate drive signals for controlling the IGBT's 21 and 22 with a certain dead time. A resonant voltage detector 40 detects the phase of the resonant voltage generated by the resonant capacitor 27. The resonant voltage detector includes a high tolerance capacitor 41 for detecting the phase of the resonant voltage and a photo coupler 42.

A phase comparator 50 compares the phase of the resonant voltage signal detected through the resonant voltage detector 40, with the phase of the drive signal generated by the gate drive circuit 30.

An input current detector 60 detects the amount of current input from an AC source 1 to the main power supply 10 using a current transformer CT2. A resonant current controller 70 controls the resonant AC current by sensing the current flowing in the resonant inductor 25 using a transformer CT1 and adjusting the resonant current to stay within a constant range.

A phase difference setting circuit 80 sets a reference voltage which is equal to the phase difference between the resonant voltage and the drive signal using the output signals from the input current detector 60 and the resonant current controller 70. A phase difference controller 90 outputs a reference voltage when the phase difference is below a predetermined value. A low pass filter 100 compares and filters the signals from the phase difference setting circuit 80 and the phase comparator 50. A voltage controlled oscillator VCO 110 controls the switching frequency of the resonant current in accordance with the output signal from the low pass filter 100. An oscillating frequency controller 120 maintains the phase difference at a predetermined value if the phase difference signal drops below a preset level.

The conventional resonant convertor control system controls the resonant current of the inverter 20 by adjusting the switching frequency in accordance with changes in the load.

A problem with the conventional resonant control system is that it requires expensive components such as the high tolerance capacitor 41 and the photo coupler 42 in order to detect the resonant voltage of the inverter 20. Another problem with the conventional resonant control system is the high level of complexity required for adjusting the switching frequency. This increases the cost and reduces the reliability of the system.

Accordingly, a need remains for a resonant convertor control system which overcomes the above-mentioned problems.

SUMMARY OF THE INVENTION

It is, therefore, an object of the invention to provide a simplified and reliable resonant convertor control system.

A further object of the invention is to reduce the cost of a resonant converter control system.

To achieve these and other objects, the applicants have invented a resonant convertor control system which regulates a resonant AC current based on the amount of input power consumed by the system. The switching frequency and resonant AC current are limited by a phase difference assurance circuit which compares the phase of a drive signal with the phase of the resonant AC current. An advantage of the present invention is that, because it detects the phase of the resonant current instead of the resonant voltage, it eliminates the need for the costly components required to detect the resonant voltage. Another advantage of the present invention is that it greatly simplifies the resonant convertor control circuit.

One aspect of the present invention is a resonant convertor control system comprising a main power supply that supplies a DC power signal; an inverter coupled to the main power supply to receive the DC power signal, the inverter having a switch that turns on and off responsive to a drive signal to convert the DC power signal to a resonating AC current signal; a drive stage coupled to the inverter, the drive stage generating the drive signal responsive to a frequency signal; an input current controller coupled to the main power supply to receive a first sense signal which indicates the power consumed by the main power supply, the input current controller generating a first control signal responsive to the first sense signal; a phase difference assurance circuit coupled to the inverter to receive a second sense signal which indicates the resonating AC current signal and coupled to the drive stage to receive the drive signal, the phase difference assurance circuit generating a second control signal responsive to phase difference between the second sense signal and the drive signal; and a frequency stage coupled to the input current controller to receive the first control signal and coupled to the phase difference assurance circuit to receive the second control signal, the frequency stage generating the frequency signal responsive to the first and second control signals.

Another aspect of the present invention is a method for controlling a resonant converter comprising: generating a drive signal responsive to a frequency signal; converting a DC power signal to a resonating AC current signal responsive to the drive signal, thereby consuming power; generating a first sense signal responsive to the power consumed; generating a first control signal responsive to the first sense signal; generating a second sense signal responsive to the resonating AC current signal; comparing the phase of the second sense signal and the phase of the drive signal, thereby generating a second control signal; adjusting the frequency signal responsive to the first control signal, thereby limiting the power consumed; and adjusting the frequency signal responsive to the second control signal, thereby assuring a phase difference between the second sense signal and the drive signal.

The foregoing and other objects, features and advantages of the invention will become more readily apparent from the following detailed description of a preferred embodiment of the invention which proceeds with reference to the accompanying drawings.

DETAILED DESCRIPTION

Figure 1:
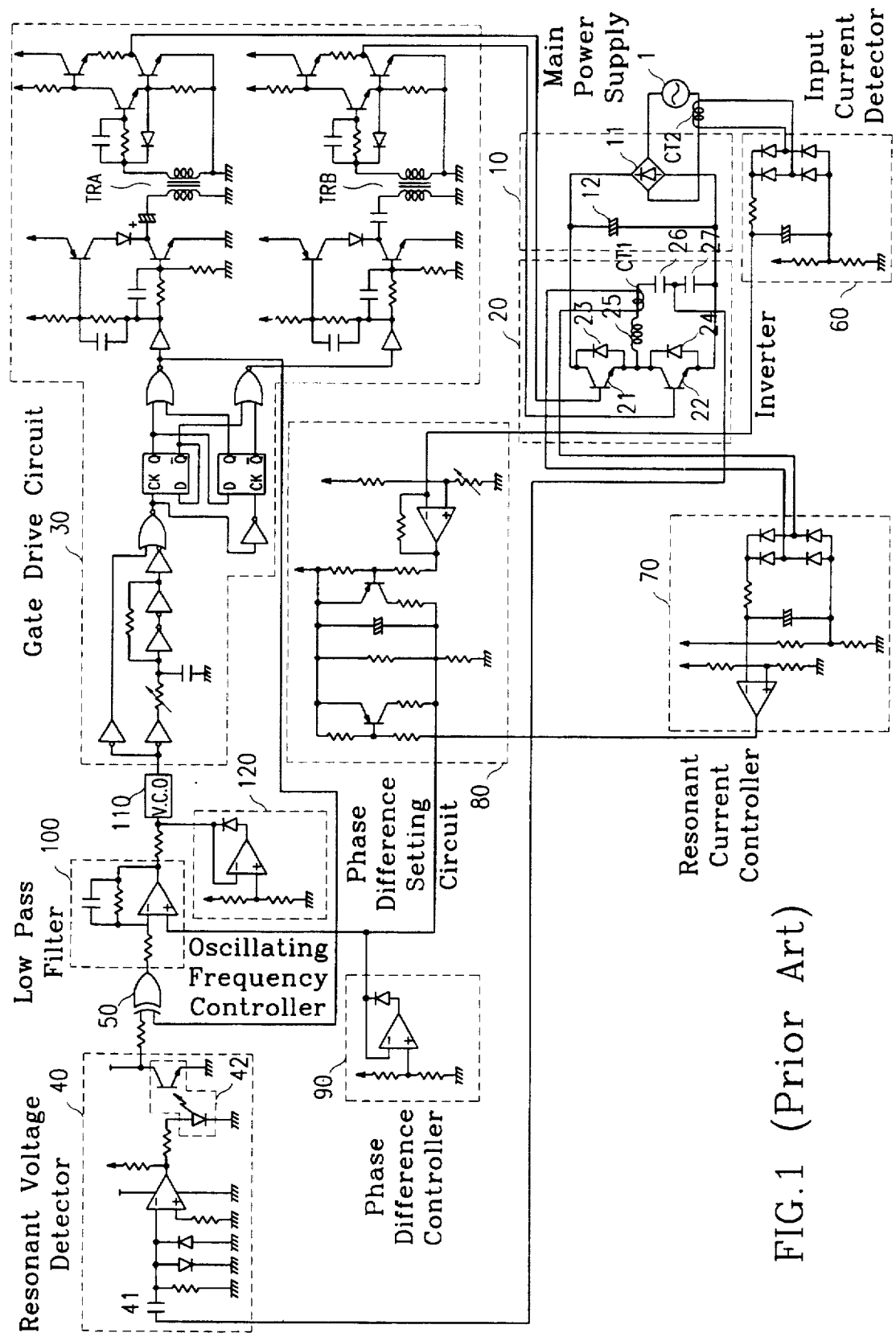
FIG. 1 is a schematic diagram of a prior art resonant convertor control system.
Figure 2:
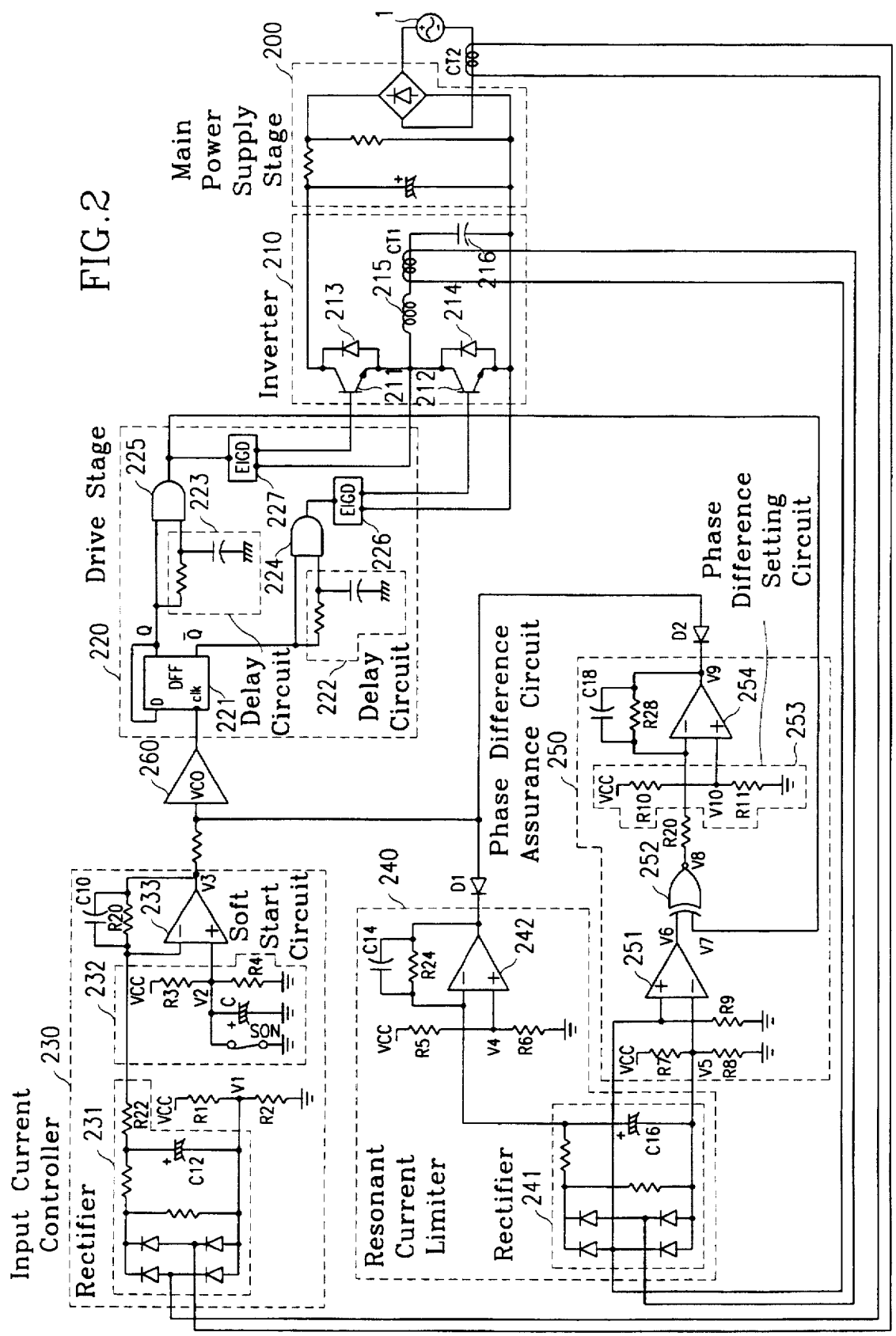
FIG. 2 is a schematic diagram of an embodiment of a resonant convertor control system in accordance with the present invention.

An embodiment of a resonant convertor control circuit in accordance with the present invention is shown in FIG. 2. Prior to describing the detailed structure of this system, the key components will be identified. Then a more detailed description of the components will be provided along with a description of the operation of the system.

Referring to FIG. 2 a resonant convertor control system in accordance with the present invention includes a power section comprising a main power supply stage 200 and an inverter 210. The main power supply 100 converts an alternating current AC power signal from an AC power source 1 to a DC power signal. The inverter 210 includes first and second switches 211 and 212 which switch on and off in response to first and second drive signals, thus converting the DC power signal to a resonating AC current signal and providing control of the resonant voltage of capacitor 216 and the resonant AC current of conductor 215. The first and second switches 211 and 212, which are preferably isolated gate bipolar junction transistors (IGBT), are switched on alternately by the drive signals.

A drive stage 220 is coupled to the inverter 210 and generates the first and second drive signals with a certain dead time and at a switching frequency which is determined by a frequency signal.

An input current controller 230 is coupled to the main power supply 200 to receive a first sense signal which indicates the amount of power or current consumed by the main power supply stage and generates a first control signal for controlling the input current of the main power supply stage by amplifying the difference between the first sense signal and a reference signal voltage V2.

A resonant current limiter 240 is coupled to the inverter 210 to receive a second sense signal which indicates the level of the resonant AC current signal and generates a control signal for limiting the resonant AC current by comparing and amplifying the difference between the second sense signal and a reference signal V4.

A phase difference assurance circuit 250 is coupled to the inverter 210 to receive the second sense signal and to the drive stage 220 to receive one of the two drive signals. The phase difference assurance circuit generates a control signal for maintaining the phase difference at a minimum value by comparing the phase of the resonant AC current signal with the phase of the drive signal and generating the control signal when the phase difference is higher than a constant value determined by a reference signal V10. A frequency stage 260 is coupled to the input current controller 230 and generates the frequency signal in response to the control signal from the input current controller to regulate the current consumed by the main power supply 200. The frequency stage is also coupled to the resonant current limiter 240 to limit the resonant AC current in response to the control signal from the resonant current limiter, and to the phase difference assurance circuit 250 to maintain the phase difference in response to the control signal from the phase difference assurance circuit.

More detailed consideration will now be given to the structure of the circuit of FIG. 2. The drive stage 220 includes a D flip-flop 221 which has a clock input terminal CLK which receives the frequency signal, a data input terminal D, an output terminal Q which is connected back to provide feedback to the input terminal D, and an inverted output terminal QB. The output terminal's Q and QB are connected to first and second delay circuits 223 and 222, respectively, which are simple RC delay circuits. A first two input AND gate 225 has one input terminal connected to the Q output terminal of the D flip-flop and another input terminal connected to the output of the first delay circuit 223. The first drive signal is generated at the output terminal of AND gate 225 and is connected to the first switch transistor 211 through an electrically insulated gate driver (EIGD) 227. A second AND gate 224 has one input terminal connected to the QB output terminal of the D flip-flop and another input terminal connected to the output of the second delay circuit 222. The second drive signal is generated at the output terminal of AND gate 224 and is coupled to the second switching transistor 212 through EIGD 227. Thus, the drive stage 220 alternately drives switches 211 and 212 with the first and second drive signals which have a certain dead time.

The input current controller 230 includes a reference signal generator which generates a reference signal V2. An amplifier 233 amplifies and filters the difference between the first sense signal, which indicates the amount of current consumed by the main power supply 200, and the reference signal V2 to generate a first control signal V3. The reference signal generator comprises resistors R3 and R4 which divide the voltage Vcc and set the reference voltage V2. The amplifier 233 comprises an operational amplifier which has a noninverting input terminal (+) connected to the reference signal generator to receive the reference signal V2, an inverting input terminal (−) connected to an input resistor R22 to receive the first sense signal, and an output terminal connected back to the inverting input terminal through a feedback resistor R20. The amplifier 233 also includes a capacitor C10 coupled between the output terminal and the noninverting input terminal of the operational amplifier. The first control signal V3 for controlling the input current consumed by the main power supply 200 is generated at the output terminal of the operational amplifier.

The input current controller 230 also includes a first current transformer CT2 which is coupled to the main power supply 200 to generate the first sense signal which indicates the amount of current consumed by the main power supply. A rectifier 231 includes a rectifier bridge having two input terminals connected to the current transformer CT2 and a capacitor C22 connected across the output terminals of the rectifier bridge. Thus, the rectifier 231 rectifies and filters the first sense signal. A second reference signal generator includes resistors RI and R2 which divide the voltage Vcc, thereby setting the reference signal V1 which is greater than zero volts. The second reference generator signal is connected to the negative terminal of the capacitor to supply the reference signal V1 to the rectifier 231. The positive terminal of the capacitor is connected through the input resistor R22 to amplifier 233.

The input current controller 230 also includes a soft start circuit 232 which is connected to the first reference signal generator to progressively increase the level of the first reference signal V2 at a gradual rate after the system starts, thereby gradually increasing the value of the resonant AC current. The soft start circuit includes a capacitor C connected between node V2 and ground and a normally on switch NOS connected in parallel with capacitor C. When switch NOS is closed, the reference signal V2 is at zero volts. When the switch is open, the reference signal V2 gradually increases, thereby providing a progressively increasing reference signal to the error amplifier 233.

The resonant current limiter 240 includes a third reference signal generator that generates a third reference signal V4 and an amplifier for amplifying the difference between the second sense signal and the third reference signal. The third reference signal generator includes resistors R5 and R6 which divide the voltage Vcc and set the reference voltage signal V4. The amplifier includes an operational amplifier 242 having a noninverting input terminal (+) connected to the third reference signal generator to receive the third reference signal V4, an inverting input terminal (−) for receiving the second sense signal, and an output terminal connected back to the inverting input terminal through a feedback resistor R24. The amplifier also includes a capacitor C14 connected in parallel with the feedback resistor. The second control signal is generated at the output terminal of operational amplifier 242 and is connected to the frequency stage through a diode D1 having a cathode connected to the output terminal of the operational amplifier and an anode connected to the frequency stage.

The resonant current limiter 240 also includes a second current transformer CT1 which is connected to the resonant conductor 215 inside inverter 210 and generates the second sense signal which indicates the level of the resonant AC current. A rectifier 241 includes a rectifier bridge having two input terminals connected to current transformer CT1 and a capacitor connected across the output terminals of the rectifier bridge. The positive terminal of the capacitor C16 is connected to the noninverting input terminal (+) of error amplifier 242. Thus, the resonant current limiter 240 generates the second control signal by amplifying the difference of the third reference signal V4 and the rectified and filtered second sense signal which is received from rectifier 241. When the output voltage of rectifier 241 is greater than the voltage of the third reference signal V4, the second control signal will be generated and coupled to the frequency stage through diode D1.

The phase difference assuring circuit 250 also utilizes the second current transformer CT1 which generates the second sense signal and the rectifier bridge in rectifier 241. The negative output terminal of the rectifier bridge is connected to a fourth reference signal generator which includes resistors R7 and R8 which divide the voltage Vcc to generate the fourth reference signal V5. The phase difference assuring circuit 250 includes a comparator 251 having an inverting input terminal (−) connected to the fourth reference signal generator to receive the fourth reference signal V5, a noninverting input terminal (+) connected to one of the two terminals of current transformer CT1, and an output terminal for generating a signal V6. A sense resistor R9 is connected between the noninverting input terminal of comparator 251 and ground to detect the resonant AC current.

An exclusive NOR gate 252 has a first input terminal connected to their output terminal of comparator 251 to receive the signal V6, a second input terminal connected to the output terminal of AND gate 225 in the driver stage 220 to receive the first drive signal, and an output terminal for generating a signal V8. A fifth reference signal generator, also referred to as a phase difference setting circuit 253, includes resistors R10 and R11 which divide the voltage Vcc to set the fifth reference signal V10. A filter amplifies the difference between the fifth reference signal V10 and the signal V8 to generate a third control signal which maintains the phase difference between the first drive signal and the resonant AC current signal above a constant level. The filter includes an operational amplifier 254 having a noninverting input terminal (+) connected to the fifth reference signal generator V10, an inverting input terminal (−) connected to the output terminal of exclusive NOR gate 252 through an input resistor r26 to receive the signal V8, and an output terminal connected back to the inverting input terminal through a feedback resistor R28. A capacitor C18 is connected in parallel with the feedback resistor. The third control signal V9 is generated at the output terminal of operational amplifier 254 and is coupled to the frequency stage through a diode D2 which has a cathode connected to the output terminal of operational amplifier 254 and an anode connected to the frequency stage. Thus, the phase difference assurance circuit 250 generates the third control signal V9 when the voltage of output signal V8 from exclusive NOR gate 252 is greater than the voltage of the fifth reference signal V10.

The frequency stage includes a voltage controlled oscillator 260 which has an input terminal connected to the output terminal of operational amplifier 233 through a resistor to receive the first control signal V3. The input terminal of the voltage controlled oscillator (VCO) is also connected to the anode of diode D1 and the anode of diode D2 to receive the second and third control signals, respectively. The output terminal of VCO 260 is connected to the CLK input terminal of flip-flop 221. The VCO generates the frequency signal which sets the switching frequency of switches 211 and 212 in response to the voltage level of the signal received at the input terminal of the VCO.

The operation of the embodiment of the present invention shown in FIG. 2 will now be described in more detail. The input current consumed by main power supply 200 is detected by current transformer CT2 which generates a first sense signal which indicates the amount of current consumed by the main power supply. The first sense signal is rectified and filtered by rectifier 231 in input current controller 230.

If the voltage level of the rectified and filtered first sense signal is lower than the voltage of the first reference signal V2 as controlled by the soft start circuit 232, the output voltage of the first control signal V3 increases which reduces the output frequency of VCO 260, thereby causing the resonant AC current signal to increase. On the other hand, if the voltage level of the rectified and first sense signal is lower than the voltage of the reference signal V2, the output frequency of VCO 260 increases and the resonant current increases.

In more detail, the rectified and filtered voltage level will always be greater than zero volts by an amount equal to the voltage V1 at resistor R2. However, the output voltage V3 of error amplifier 233 decreases because the voltage of the first reference signal V2 is zero volts when the normally on switch NOS is closed. Thus, the output frequency of VCO 260 increases and the resonant AC current decreases.

When the normally on switch is turned off, the voltage level of signal V2 gradually increases at a rate determined by the time constant of the capacitor C and resistor R4. This causes the output voltage V3 of error amplifier 233 to gradually increase and the output frequency of VCO 260 to gradually decrease, thereby causing the switching frequency to reach a normal level.

Current transformer CT1 generates the second sense signal which indicates the level of the resonant AC current signal in inverter 210. The second sense signal is rectified and filtered by rectifier 241 in resonant current limiter 240. If the voltage level of the rectified and filtered signal is greater than the voltage level of the third reference signal V4 applied to resistor R6, the voltage level of the second control signal generated at the output terminal of amplifier 242 decreases, which in turn decreases the voltage level of the signal at the input terminal of VCO 260. Thus, the switching frequency increases and the resonant AC current decreases. In contrast, if the voltage level of the rectified and filtered second sense signal is lower than the voltage of V4, the output signal of error amplifier 242 increases, but the reverse bias of diode D1 prevents the signal from being coupled to the VCO 260.

Figure 3:
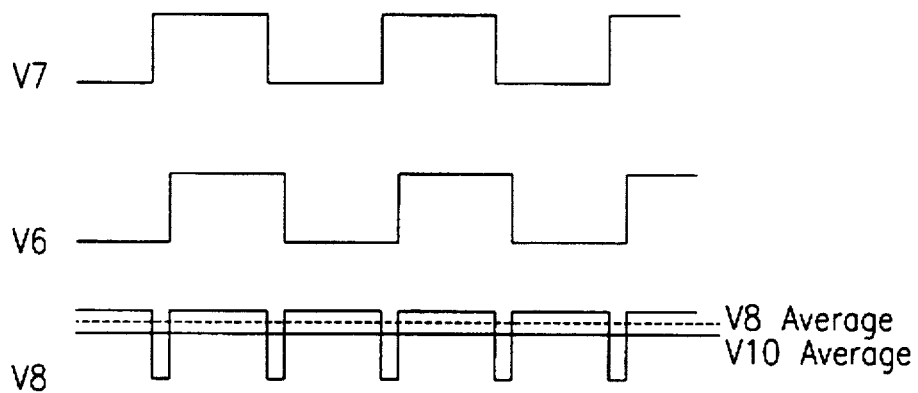
FIGS. 3 and 4 are timing diagrams showing wave forms of signals at various points in the circuit of FIG. 2 under different operating conditions.
Figure 4:
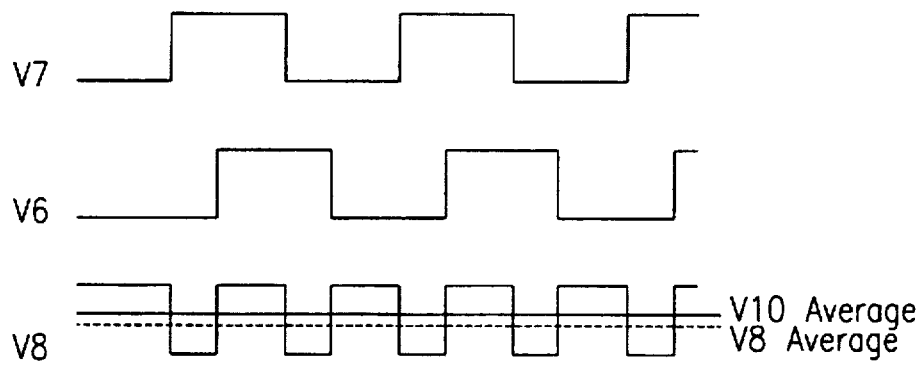

The phases of the resonant AC current and the drive signal are compared by exclusive NOR gate 252 which is used as a phase comparator in the phase difference assuring circuit 250. If the average output signal V8 of exclusive NOR gate 252 is higher than the voltage V10 set by the phase difference setting circuit 253, as shown in FIG. 3, the output voltage of the third control signal V9 from error amplifier 254 decreases and the output frequency of VCO 260 increases. Thus, the phase of the drive signal is delayed more than the phase of the resonant AC current. In other words, if the phase difference between the drive signal and the resonant AC current signal is lower than the value set through the phase difference setting circuit 253, the phase difference assuring circuit 250 will operate to delay the phase of the drive signal. However, if the phase difference between the drive signal and the resonant AC current signal is greater than the value set through phase difference setting circuit 253 as shown in FIG. 4, the phase difference assuring circuit 250 does not operate to adjust the phase because the output signal of error amplifier 254 increases and diode D2 is reversed bias.

In the absence of a phase difference assuring circuit 250 which operates as described above, a large power loss will be generated due to the short circuit phenomena resulting from the reverse recovery characteristics of fast recovery diodes 213 and 214 connected in anti-parallel with IGBT'S 211 and 212, respectively, when the switching frequency is lower than the resonant frequency.

An advantage of a resonant convertor control system constructed in accordance with the present invention is that it improves the reliability and reduces the cost of the whole system. Another advantage is that is simplifies the components by utilizing the phase difference assuring circuit and eliminating the conventional resonant voltage detector. A resonant convertor control system in accordance with the present invention can be used for an induction heating cooker or for an induction heating kettle for cooking rice.

Having described and illustrated the principles of the invention in a preferred embodiment thereof, it should be apparent that the invention can be modified in arrangement and detail without departing from such principles. We claim all modifications and variations coming within the spirit and scope of the following claims.

We claim:

1. A resonant converter control system comprising:
   a power section including:
   a main power supply having an output port for supplying a DC power signal; and
   an inverter having an input port coupled to the output port of the main power supply to receive the DC power signal and a switch that turns on and off responsive to a drive signal to convert the DC power signal to a resonating AC current signal;
   a drive stage coupled to the inverter, the drive stage generating the drive signal responsive to a frequency signal;
   a current controller coupled to the power section to receive a first sense signal that indicates the power consumed by the power supply section, the current controller generating a first control signal responsive to the first sense signal;
   a phase difference assurance circuit coupled to the inverter to receive a second sense signal that indicates the resonating AC current signal and coupled to the drive stage to receive the drive signal, the phase difference assurance circuit generating a second control signal responsive to a phase difference between the second sense signal and the drive signal; and
   a frequency stage coupled to the current controller to receive the first control signal and coupled to the phase difference assurance circuit to receive the second control signal, the frequency stage generating the frequency signal responsive to the first and second control signals.

2. A system according to claim 1 further including a resonant current limiter coupled to the inverter to receive the second sense signal, the resonant current limiter generating a third control signal responsive to the second sense signal, and wherein the frequency stage controls the frequency signal responsive to the third control signal.

3. A system according to claim 1 wherein:
   the inverter further includes a second switch that turns on and off responsive to a second drive signal; and
   the drive stage generates the second drive signal responsive to the frequency signal.

4. A system according to claim 3 wherein the drive stage includes:
   a flip-flop having a clock input terminal, a data input terminal, an output terminal that is coupled to provide feedback to the data input terminal, and an inverted output terminal;
   a first delay circuit coupled to the output terminal to generate a first delay signal;
   a second delay circuit coupled to the inverted output terminal to generate a second delay signal;
   a first AND gate having a first input terminal coupled to the output terminal of the flip-flop, a second input terminal coupled to the first time delay circuit, and an output terminal for generating the first drive signal, whereby the first drive signal has a dead time; and
   a second AND gate having a first input terminal coupled to the inverted output terminal of the flip-flop, a second input terminal coupled to the second time delay circuit, and an output terminal for generating the second drive signal, whereby the second drive signal has a dead time.

5. A system according to claim 4 wherein the drive stage further includes:
   a first electrically insulated gate driver coupled between the output terminal of the first AND gate and the first switch of the inverter; and a second electrically insulated gate driver coupled between the output terminal of the second AND gate and the second switch of the inverter.

6. A system according to claim 1 wherein the frequency stage includes a voltage controlled oscillator.

7. A system according to claim 1 wherein the current controller includes:

a first reference signal generator for generating a first reference signal; and an amplifier for amplifying the difference between the first sense signal and the first reference signal and generating the first control signal.

8. A system according to claim 7 wherein the amplifier includes:

an operational amplifier having a first input terminal coupled to the first reference signal generator, a second input terminal coupled to an input resistor to receive the first sense signal, and an output terminal coupled to the second input terminal through a feedback resistor; and a capacitor coupled between the output terminal and the second input terminal of the operational amplifier.

9. A system according to claim 7 wherein the current controller further includes a soft start circuit coupled to the first reference signal generator to gradually change the first reference signal, thereby gradually increasing the resonating AC current after the system starts.

10. A system according to claim 7 wherein the current controller further includes:

a first current transformer coupled to the main power supply to generate the first sense signal responsive to the power consumed by the main power supply;

a rectifier coupled to the first current transformer to rectify the first sense signal;

a second reference signal generator coupled to the rectifier to provide a second reference signal to the rectifier; and a capacitor coupled to the rectifier to filter the first sense signal.

11. A system according to claim 2 wherein the resonant current limiter includes:

a third reference signal generator for generating a third reference signal; and an amplifier for amplifying the difference between the second sense signal and the third reference signal and generating the third control signal.

12. A system according to claim 11 wherein the amplifier includes:

an operational amplifier having a first input terminal coupled to the first reference signal generator, a second input terminal coupled to an input resistor to receive the first sense signal, and an output terminal coupled to the second input terminal through a feedback resistor;

a capacitor coupled between the output terminal and the second input terminal of the operational amplifier; and a diode having a cathode coupled to the output terminal of the operational amplifier and an anode coupled to the frequency stage.

13. A system according to claim 11 wherein the resonant current limiter further includes:

a second current transformer coupled to the inverter to generate the second sense signal responsive to the resonating AC current signal;

a rectifier coupled to the second current transformer to rectify the second sense signal; and a capacitor coupled to the rectifier to filter the second sense signal.

14. A system according to claim 1 wherein the phase difference assurance circuit includes:

an exclusive NOR gate having a first input terminal coupled to the drive stage to receive the drive signal, a second input terminal for receiving the second sense signal, and an output terminal; and a filter having a first input terminal coupled to the output terminal of the exclusive NOR gate, a second input terminal coupled to a phase difference setting circuit to receive a fifth reference signal, and an output terminal for generating the second control signal when the phase difference between the drive signal and the second sense signal is not adequate.

15. A system according to claim 14 wherein the phase difference assurance circuit further includes:

a second current transformer coupled to the inverter to generate the second sense signal responsive to the resonating AC current signal;

a rectifier coupled to the second current transformer to rectify the second sense signal;

a sense resistor coupled to receive the rectified second sense signal;

a fourth reference generator for generating a fourth reference signal; and a comparator having a first input terminal coupled to the fourth reference generator, a second input terminal coupled to the resistor, and an output terminal coupled to the first input terminal of the exclusive NOR gate.

16. A system according to claim 14 wherein the filter includes:

an operational amplifier having a first input coupled to the fifth reference generator, a second input terminal coupled to the output terminal of the exclusive NOR gate through an input resistor, and an output terminal coupled to the second input terminal through a feedback resistor;

a capacitor coupled between the output terminal and the second input terminal of the operational amplifier; and a diode having a cathode coupled to the output terminal of the operational amplifier and an anode coupled to the frequency stage.

17. A resonant converter control system comprising:

a power section including:

power input means for supplying a DC power signal; and means for converting the DC power signal to a resonating AC signal responsive to a drive signal;

means for generating the drive signal responsive to a frequency signal;

means for generating a first control signal to control the power consumed by the power section;

means for generating a second control signal to control the phase difference between the drive signal and the resonating AC signal; and means for generating the frequency signal responsive to the first and second control signals.

18. A system according to claim 17 further including means for generating a third control signal to limit the resonating AC signal.

19. A method for controlling a resonant converter comprising:

generating a drive signal responsive to a frequency signal;

converting a DC power signal to a resonating AC current signal responsive to the drive signal, thereby consuming power;

generating a first sense signal responsive to the power consumed;

generating a first control signal responsive to the first sense signal;

generating a second sense signal responsive to the resonating AC current signal;

comparing the phase of the second sense signal and the phase of the drive signal, thereby generating a second control signal;

adjusting the frequency signal responsive to the first control signal, thereby limiting the power consumed; and adjusting the frequency signal responsive to the second control signal, thereby assuring a phase difference between the second sense signal and the drive signal.

20. A method according to claim 19 further including:

generating a third control signal responsive to the second sense signal; and adjusting the frequency signal responsive to the third control signal, thereby limiting the resonating AC current.

21. A method according to claim 19 further including:

generating a second drive signal; and converting the DC power signal to the resonating AC current signal responsive to the second drive signal.

22. A method according to claim 21 wherein generating a first drive signal and a second drive signal includes alternating between generating the first drive signal and generating the second drive signal.

23. A method according to claim 19 wherein the first and second drive signals include a dead time.

* * * * *